(12) United States Patent
Komatsu et al.

(10) Patent No.: US 8,114,190 B2
(45) Date of Patent: Feb. 14, 2012

(54) EXHAUST GAS TREATMENT METHOD AND SYSTEM FOR CEMENT BURNING FACILITY

(75) Inventors: Yoshiaki Komatsu, Tokyo (JP); Michio Ishizaki, Tokyo (JP); Hirokazu Shima, Ibaraki (JP); Hiroyuki Matsuda, Fukuoka (JP)

(73) Assignee: Mitsubishi Materials Corporation, Tokyo (JP)

( * ) Notice: Subject to any disclaimer, the term of this patent is extended or adjusted under 35 U.S.C. 154(b) by 199 days.

(21) Appl. No.: 12/564,643

(22) Filed: Sep. 22, 2009

(65) Prior Publication Data

US 2010/0083878 A1    Apr. 8, 2010

(30) Foreign Application Priority Data

Oct. 8, 2008    (JP) ................. 2008-261682

(51) Int. Cl.
  *C04B 7/43* (2006.01)
  *B01D 53/68* (2006.01)
(52) U.S. Cl. ............... 95/1; 95/271; 106/751; 96/408
(58) Field of Classification Search ............ 95/1, 34, 95/271, 273; 106/751, 752; 423/240 R, 423/240 S; 96/408
  See application file for complete search history.

(56) References Cited

U.S. PATENT DOCUMENTS 4,115,137 A * 9/1978 Nudelman et al. ............ 106/740
5,937,771 A * 8/1999 Sutoh et al. .................... 110/345
5,951,279 A * 9/1999 Hunold et al. ................. 432/106
6,068,826 A * 5/2000 Maury et al. ............... 423/240 R
7,789,944 B2 * 9/2010 Saito et al. ....................... 95/228
7,947,242 B2 * 5/2011 Saito et al. .................. 423/242.1

FOREIGN PATENT DOCUMENTS

JP    2001-239132 A  *  9/2001
JP    3318714           6/2002
WO    WO 97/21638      6/1997

OTHER PUBLICATIONS

U.S. Appl. No. 12/307,285, filed Jan. 2, 2009, Komatsu, et al.

* cited by examiner

*Primary Examiner* — Frank Lawrence, Jr.
(74) *Attorney, Agent, or Firm* — Oblon, Spivak, McClelland, Maier & Neustadt, L.L.P.

(57) ABSTRACT

Method and system for a cement burning facility. When exhaust gas in a part of a preheater or a kiln inlet of a cement kiln is extracted, a cement material is dispersed. The dispersed amount of the cement material is adjusted to maintain the temperature of the extracted gas between 950° C. and 1,150° C. The extracted gas is cooled to at most the melting point of a chlorine compound. A solid-gas separation device adjusts classification particle size to between 15 μm and 30 μm. A dust trap removes fine powder dust with a particle size equal to or smaller than the classification particle size. The amount of fine powder dust collected by the dust trap is maintained between 50 g/m$^3$N and 150 g/m$^3$N, with the concentration of chlorine in the collected fine powder dust set to between 5% and 20%.

3 Claims, 4 Drawing Sheets

EXHAUST GAS TREATMENT METHOD AND SYSTEM FOR CEMENT BURNING FACILITY

BACKGROUND OF THE INVENTION

1. Field of the Invention

The present invention relates to an exhaust gas treatment method and system for a cement burning facility using a chlorine bypass to inhibit a possible increase in the concentration of chlorine in the system of the cement burning facility.

2. Description of the Related Art

In recent years, in order to solve waste disposal problems, various wastes are used as part of a cement material or part of a heating fuel used in a cement kiln. However, when wastes such as a synthetic resin are fed into the cement kiln as part of the fuel, a volatile chlorine component is generated during combustion. The chlorine component is entrained in exhaust gas discharged from the cement kiln and fed to an upper stage side of a preheater. However, when the atmosphere temperature decreases to at most the melting point of the chlorine component as the exhaust gas is transferred to the upper stage side of the preheater, the chlorine component is condensed and adheres to the cement material. The chlorine component is then fed again to the inside of the cement kiln. Furthermore, the chlorine component is evaporated again in response to an increase in atmosphere temperature.

Thus, the chlorine component drawn into the system of the cement burning facility is circulated through the cement kiln and the preheater while being repeatedly evaporated and condensed. Furthermore, a chlorine component generated from newly fed wastes is added to the circulating chlorine component. This increases the concentration of the chlorine component to cause, for example, coating, resulting in blockage in the preheater. Thus, disadvantageously, the facility is prevented from operating stably, and the quality of manufactured cement clinker is also affected.

Thus, in order to solve the above-described problem, for example, Japanese Patent No. 3318714 proposes a kiln exhaust gas treatment method based on the chlorine bypass, which method including a step of extracting part of kiln exhaust gas from a kiln, a step of cooling the extracted exhaust gas to at most the melting point of a chlorine compound, a step of using a classifier to separate dust in the exhaust gas into coarse powder and fine powder, and a step of returning the separated coarse powder to the kiln and feeding the fine powder to the lower stage side of the classifier, wherein the rate of extraction amount of the kiln exhaust gas is set to more than 0% and at most 5%, the separation particle size in the classifier is set to 5 μm to 7 μm, and the feed amount of the fine powder is set to at most 0.1% of the production amount of the clinker.

According to the kiln exhaust gas treatment method configured as described above, the exhaust gas containing the fine powder dust separated by the classifier and having a high chlorine content is fed to a dust collector. Furthermore, the fine powder dust with the high chlorine concentration is collected and discharged to the outside of the system. Thus, the rotary kiln can be stably operated. Additionally, the chlorine can be effectively removed with a minimized heat loss and with the required amount of extracted gas reduced. This reduces the required size of the treatment facility. As a result, both the required space and cost of the facility are reduced, allowing the kiln to be economically and stably operated.

However, in the conventional kiln exhaust gas treatment method described above, the particle size of the fine powder dust collected by the dust collector is set to within the range of very small particle sizes, for example, between 5 μm to at most 7 μm. This prevents the use of a general-purpose classifier, and a classifier exhibiting high performance needs to be installed. Furthermore, the classifier requires precise control during operation. This disadvantageously increases the installation cost of the classifier.

In addition, the very fine powder dust is collected, extremely increasing the concentration of chlorine in the collected fine powder dust. Thus, if the chlorine concentration of the fine powder dust exceeds 20%, then for example, deliquescence of the chlorine compound adsorbed to the fine powder dust may significantly degrade the handling property of the collected fine powder dust. Then, disadvantageously, the fine powder dust adheres to the inner peripheral wall of a conveying pipe, a hopper, or the like (to cause coating), resulting in the likelihood of an accident such as clogging of the hopper or a chute. This unfortunately hinders stable operation and increases maintenance costs.

Moreover, if organic sludge such as sewage sludge is introduced, as the above-described wastes, into a kiln inlet part or a calciner of the cement kiln for treatment, metal chloride (KCl and NaCl) contained in the exhaust gas as a chloride reacts with moisture contained in the organic sludge and $CO_2$ and $SO_2$ in the exhaust gas as shown by the following expression. The metal chloride thus becomes sulfate or carbonate and generates hydrogen chloride (HCl).

Even when cooled close to the room temperature, most of the hydrogen chloride thus taken into the exhaust gas is present in the form of vapor.

Thus, some of the conventional kiln exhaust gas treatment methods can collect the chlorine entrained in the form of metal oxide but not the hydrogen chloride. This may disadvantageously reduce the chlorine bypass amount (the amount of chlorine removed per unit extracted gas amount) in the chlorine bypass. Additionally, hydrogen chloride (HCl) disadvantageously remains in the exhaust gas, which can thus not directly be discharged to the atmosphere. Furthermore, an acid dew point may be reached, resulting in adverse effects such as corrosion of the apparatus.

Moreover, in the above-described cement manufacturing facility, the amount of dust contained in the extracted gas generally varies significantly depending on the operating condition of the cement kiln, the adhesion status of coating, or a change in the number of rotations of the cement kiln.

Thus, the amount of dust collected through the chlorine bypass also varies substantially, thus varying the quality of the collected dust. If the collected dust is finally added to a cement material for cement manufacturing, the quality of the resulting cement may be affected.

SUMMARY OF THE INVENTION

The present invention has been made in view of the above-described circumstances. An object of the present invention is to provide an exhaust gas treatment method and system for a cement burning facility which allows the handling property of collected powder dust to be improved and which enables maintenance-free stable operation, the method and system enabling smooth removal of hydrogen chloride that may result from burning of organic sludge.

In order to solve the above-described problems, the present inventors have examined the effects of the chlorine concentration and the particle size of fine powder dust on the handling property of the fine powder dust.

First, the average particle size of cement material powder is distributed such that the maximum value is 200 μm and the minimum value is several micrometers. However, the average particle size is generally between about 20 μm and about 30 μm. Thus, the following is expected. When the classification particle size of dust entrained in the extracted gas is set to at most 10 μm, the dust finally collected from the extracted gas is mostly composed of chlorine particles. The very fine cement material powder is mixed in the dust.

Therefore, according to the present inventors' knowledge, when the classification particle size is set to at most 10 μm, not only the chlorine concentration increases extremely, but also the collected fine powder dust becomes cottony, thus extremely degrading the handling property of the fine powder dust. In this case, for example, the possible deliquescence of the chlorine component may result in the likelihood of coating that may cause blockage and clogging in the facility. Furthermore, it has been found that reducing the chlorine concentration of the fine powder dust to at most 20% allows prevention of the adhesion of or clogging with the fine powder dust caused by the coating during a conveying process.

Then, the extracted gas from the cement kiln was cooled to at most the melting point of the chlorine compound. A cyclone classifier was then used to separate dust having a particle size of at least about 25 μm from the extracted gas. Thereafter, a bag filter was used to collect fine powder dust having a particle size of at most about 25 μm. At this time, a cement material was positively dispersed in the extracted gas to change the concentration of dust in the extracted gas. Thus, the effects of the fine powder dust on the chlorine concentration were checked. As a result, as shown in FIG. 2, the chlorine concentration was found to decrease with increasing dust concentration.

Moreover, when the cement material is positively dispersed in the exhaust gas from the cement kiln from which the extracted gas is extracted, the dust concentration of the extracted gas increases, with the temperature of the exhaust gas decreasing. Furthermore, this relationship has been found to be generally proportional as shown in FIG. 3.

Figure 2:
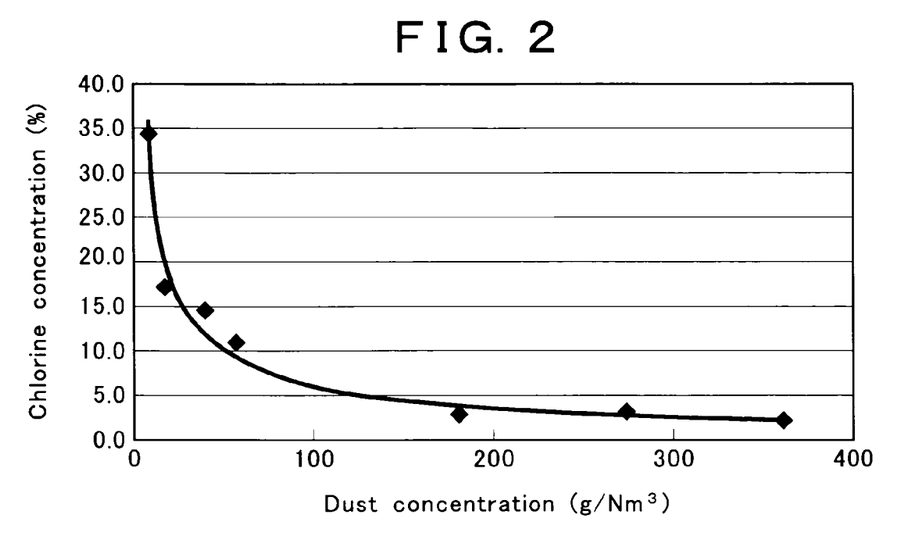
FIG. 2 is a graph showing the relationship between the concentration of dust in extracted gas and the concentration of chlorine in collected fine powder dust in the cement burning facility.
Figure 3:
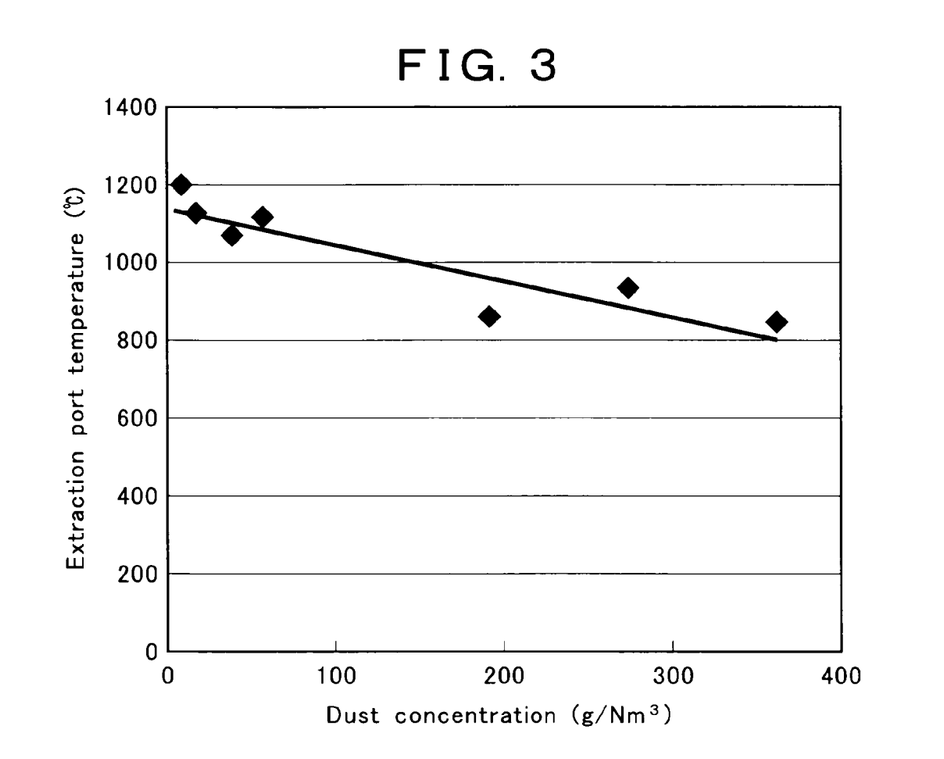
FIG. 3 is a graph showing the relationship between the temperature of the extracted gas and the dust concentration of the extracted gas in the cement burning facility.
Figure 4:
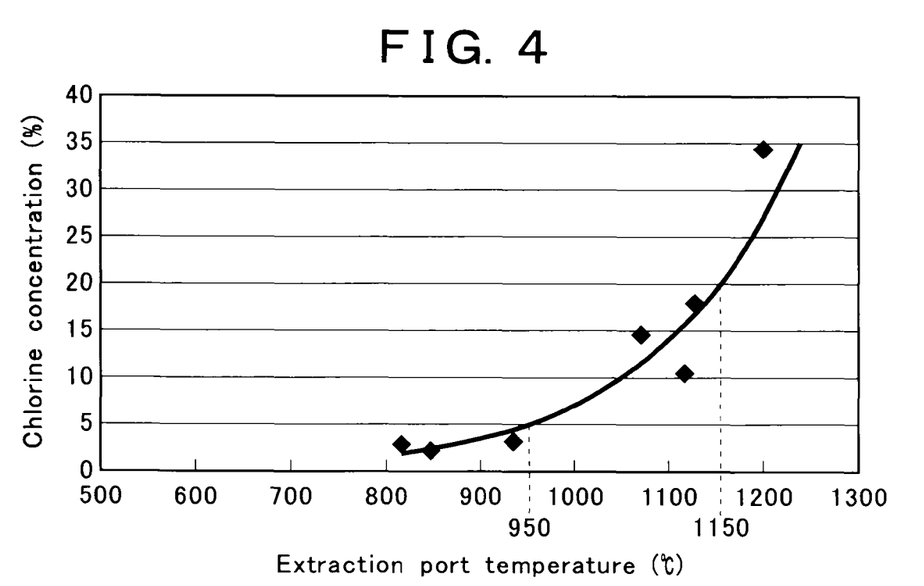
FIG. 4 is a graph showing the relationship between the temperature of the extracted gas and the chlorine concentration of the collected fine powder dust, obtained from the graphs shown in FIG. 2 and FIG. 3.

Therefore, the present inventors have found that, as shown in FIG. 2, FIG. 3, and FIG. 4, dispersing the cement material to adjust the temperature of the extracted gas allows the dust concentration of the extracted gas to be adjusted, thus enabling the easy control of the chlorine concentration of the finally collected fine powder dust. The above-described check tests indicate that the temperature of the extracted gas may be set to at most 1,150° C. in order to reduce the chlorine concentration to at most 20%, at which the handling property of the fine powder dust is not affected, as described above.

Furthermore, when the cyclone classifier is used to separate the coarse powder dust from the extracted gas, a reduction in the classification particle size reduces the particle size of the fine powder dust, thus increasing the chlorine concentration of the fine powder dust. However, as described above, when the classification particle size is set to at most 10 μm, the dust finally collected from the extracted gas is mostly composed of chlorine particles, thus extremely increasing the chlorine concentration. It has also been found that adjusting the classification particle size to at least 10 μm, more preferably, to at least 12 μm allows the chlorine concentration to be reduced to at most 20% as long as the temperature of the extracted gas is set to at most 1,150° C.

The results of the present inventors' study also indicate the following. When more cement material is dispersed in the extracted gas than in the conventional art in order to improve the handling property of the collected fine powder dust as described above, since the cement material in the lowermost part of the preheater or in the kiln inlet part of the cement kiln contains much calcined CaO with high activity, hydrogen chloride gas (HCl) in the extracted gas reacts with the CaO to generate $CaCl_2$. Then, dust trap means such as a bag filter can be used to effectively collect the $CaCl_2$.

Figure 5:
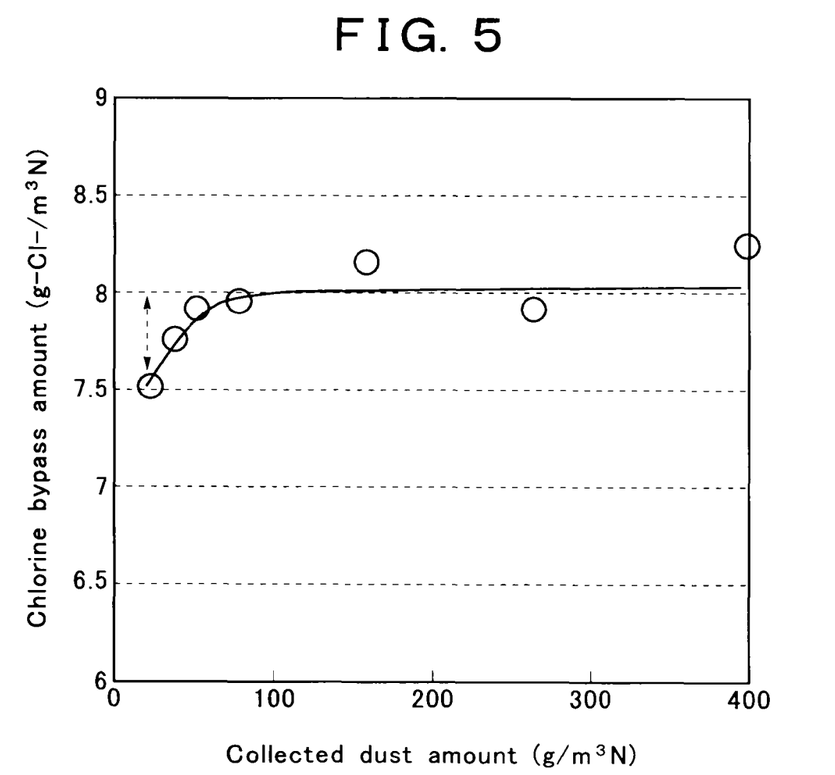
FIG. 5 is a graph showing the relationship between the amount of dust collected by dust trap means and a chlorine bypass amount in a chlorine bypass.

That is, as shown in FIG. 5, when 50 kg of sewage sludge per ton of clinker (50 kg/t-cli) was fed as organic sludge for a burning treatment, the amount of dust collected by the dust trap means (the amount of dust collected per unit extracted gas amount) was varied, with the chloride bypass amount measured. As a result, it has been found that an increase in collected dust amount, that is, an increase in the dust concentration of the extracted gas based on an increase in the disperse amount of cement material, increases the chlorine bypass amount as shown by a dotted arrow in FIG. 5, allowing hydrogen chloride gas to be effectively collected as described above.

It has also been found that setting the collected dust amount to at least 50 $g/m^3N$ allows the chlorine bypass amount to reach nearly 8 $g-Cl/m^3N$ and that a further increase in collected dust amount does not significantly change the chlorine bypass amount.

This indicates that setting the collected dust amount to between 50 $g/m^3N$ and 150 $g/m^3N$ allows the hydrogen chloride gas contained in the exhaust gas to be effectively collected without collecting an excess amount of dust.

Figure 6:
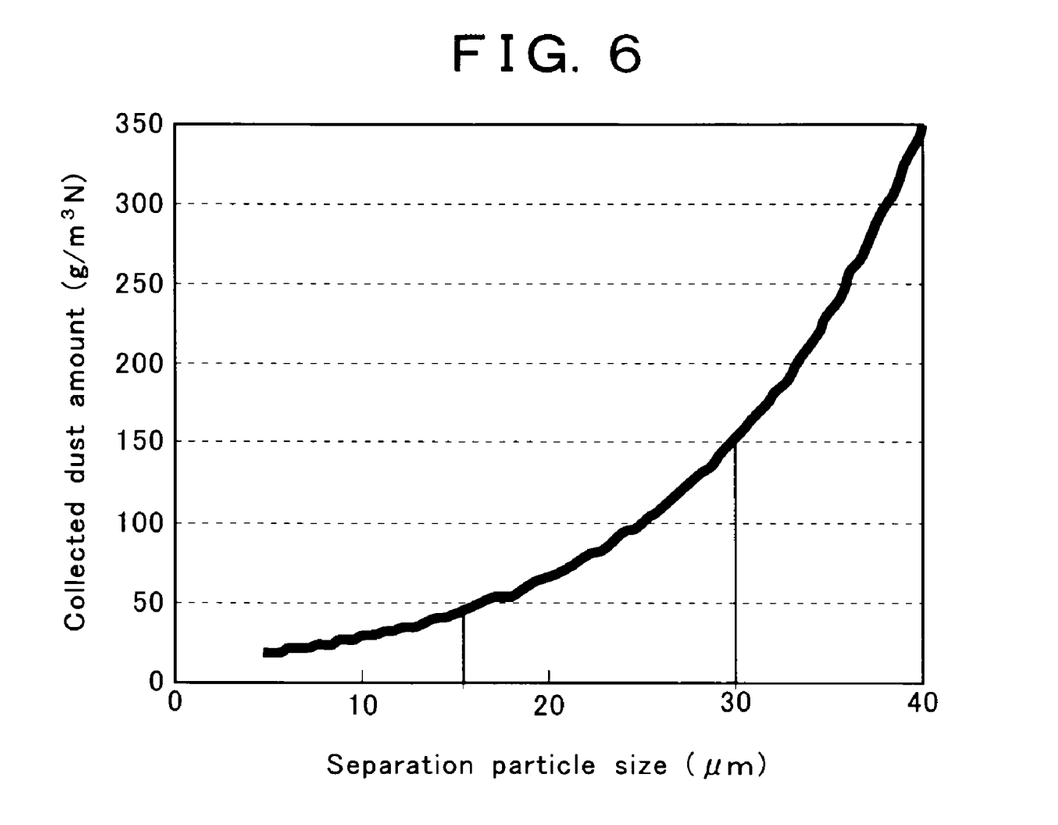
FIG. 6 is a graph showing the relationship between a separation particle size in solid-gas separation means and the amount of dust collected by the dust trap means in the chlorine bypass.

The present inventors have also confirmed the following. Even if the operating condition of the cement kiln or the adhesion status of coating varies to increase the amount of dust in the extracted gas, adjusting the classification particle size in the cyclone classifier (solid-gas separation means) to between 15 μm and 30 μm allows the collected dust amount to be maintained between 50 $g/m^3N$ and 150 $g/m^3N$ as shown in FIG. 6.

The present invention has been made based on the above-described knowledge. A first aspect of the present invention provides an exhaust gas treating method for a cement burning facility in a cement manufacturing facility in which a cement material is burned in a cement kiln and in which organic sludge is introduced into a kiln inlet part or a calciner of the cement kiln for incineration, the method extracting from a lowermost part of the preheater or the kiln inlet part of the cement kiln part of exhaust gas containing dust discharged from the cement kiln and fed to a preheater preheating the cement material, to obtain extracted gas, cooling the extracted gas to at most a melting point of a chlorine compound, then using solid-gas separation means to separate the dust of at least a predetermined particle size from the extracted gas and return the dust to the step of burning the cement material, and using dust trap means to collect and remove fine powder dust of at most the predetermined particle size from the extracted gas containing the fine powder dust, to remove the chlorine compound contained in the extracted gas, wherein the cement material is dispersed in the exhaust gas in the lowermost part of the preheater or the kiln inlet part of the cement kiln, with the dispersion amount of the cement material adjusted to maintain the temperature of the extracted gas between 950° C. and 1,150° C., and the predetermined particle size in the solid-gas separation means is adjusted to between 15 μm and 30 μm so as to maintain the amount of the fine powder dust collected by the dust trap means between 50 $g/m^3N$ and 150 $g/m^3N$, while maintaining the concentration of chlorine in the collected fine powder dust between 5% and 20%.

Here, typically, a cement material fed from the lowermost stage of the preheater into the kiln inlet part via a material chute is preferably used as the cement material dispersed in order to adjust the temperature of the extracted gas, that is, to adjust the dust concentration of the extracted gas.

In parallel with dispersion of the cement material in the exhaust gas, the following may also be introduced into the kiln inlet part in order to adjust the temperature of the kiln inlet part, that is, the temperature of the extracted gas: a cooler cement material supplementary extracted from the preheater or a cement material formed by mixing and drying various materials and not conveyed to the preheater yet (what is called a raw material).

A second aspect of the present invention provides an exhaust gas treatment system for a cement burning facility provided in a cement manufacturing facility including a transfer pipe connected to a kiln inlet part or a calciner of a cement kiln burning a cement material, to introduce organic sludge into the cement kiln for incineration, the exhaust gas treatment system extracting part of exhaust gas containing dust discharged from the cement kiln and fed to a preheater preheating the cement material, to obtain extracted gas, and removing a chlorine compound contained in the extracted gas, wherein the system includes, along a extraction duct connected to a lowermost part of the preheater or the kiln inlet part of the cement kiln to allow the extracted gas to be obtained, a cooler cooling the extracted gas obtained from the extraction duct to at most a melting point of the chlorine compound, solid-gas separation means for separating the dust of at least a predetermined particle size from the extracted gas exhausted from the cooler, dust trap means for collecting and removing fine powder dust of at most the predetermined particle size entrained in the extracted gas with the dust of at least the predetermined particle size removed therefrom in the solid-gas separation means, dust amount detection means for measuring the amount of the fine powder dust collected by the dust trap means, an induction fan provided on a lower stage side of the dust trap means to suck the extracted gas, and dispersion means for dispersing the cement material in the exhaust gas, the dispersion means being provided inside the lowermost part of the preheater or the kiln inlet part of the cement kiln and near a connection part of the extraction duct, and the system further includes drive means for adjusting the amount of the cement material dispersed by the dispersion means, temperature detection means for detecting the temperature of the extracted gas, a first control apparatus controlling the drive means based on the temperature detected by the temperature detection means, to maintain the temperature of the extracted gas between 950° C. and 1,150° C., and a second control apparatus adjusting the predetermined particle size in the solid-gas separation means to between 15 µm and 30 µm so as to maintain the amount of the fine powder dust detected by the dust amount detection means between 50 g/m$^3$N and 150 g/m$^3$N, while maintaining the concentration of chlorine in the collected fine powder dust between 5% and 20%.

According to a third aspect of the present invention, compared to the second aspect of the present invention, the solid-gas separation means is a cyclone classifier, and a flow rate adjustment apparatus for the extracted gas is provided at an inlet side of the cyclone classifier, the dust trap means is a bag filter including a chlorine concentration detection apparatus for the fine powder dust collected from the bag filter, and the second control apparatus adjusts the predetermined particle size to between 15 µm and 30 µm by controlling the suction amount of the extracted gas sucked by the induction fan and/or the flow rate adjustment apparatus for the extracted gas based on a detection signal from the chlorine concentration detection means and the amount detected by the dust amount detection means so as to set the amount of the fine powder dust collected by the dust trap means to between 50 g/m$^3$N and 150 g/m$^3$N and the concentration of chlorine in the collected fine ponder dust to between 5% and 20%.

According to any of the first to third aspects of the present invention, the dust trap means collects and removes the fine powder dust contained in the extracted gas and having the high chlorine concentration. Thus, the chlorine concentration in the system can be prevented from increasing. In addition, the cement material is dispersed in the exhaust gas in the lowermost part of the preheater or the kiln inlet part of the cement kiln, from which the extracted gas is obtained, to maintain the temperature of the extracted gas between 950° C. and 1,150° C. Consequently, the chlorine concentration of the finally collected fine powder dust can be easily set to at most 20%.

Thus, the handling property of the fine powder dust is improved. Furthermore, the facility is prevented from suffering adverse effects such as blockage or clogging with the chlorine component contained in the fine powder dust during conveyance. As a result, the facility can be stably operated.

Furthermore, the amount of the fine powder dust collected by the dust trap means is set to between 50 g/m$^3$N and 150 g/m$^3$N. Thus, hydrogen chloride gas resulting from incineration of the organic sludge contained in the exhaust gas can be allowed to react with CaO contained in the calcined cement material and having high activity. The resulting CaCl$_2$ can be effectively collected by the dust trap means.

Moreover, in conventional cement manufacturing facilities of the above-described kind, if a bag filter is used as dust trap means, SO$_2$ gas contained in the extracted gas may corrode, for example, an exhaust gas duct located on the lower stage side of the bag filter and which is in an atmosphere at a dew point or lower. This requires much time and effort such as for maintenance.

In this regard, in the present invention, the cement material containing more CaO than in the conventional art is entrained in the extracted gas. Thus, a CaO layer is formed on the surface of a filter cloth in the bag filter. SO$_2$ in the extracted gas and SO$_3$ resulting from oxidation of SO$_2$ are chemically absorbed by the CaO layer. The resulting CaSO$_3$ and CaSO$_4$ are then immobilized. The present invention thus exerts the additional effect of enabling a reduction in sulfuric acid corrosion caused by SO$_2$ or SO$_3$ contained in the extracted gas.

Furthermore, the classification particle size in the solid-gas separation means may be adjusted between 15 µm and 30 µm. Thus, for example, a general-purpose cyclone classifier or the like can be used as solid-gas separation means. This prevents an increase in facility costs.

Here, the temperature of the extracted gas is set to at least 950° C., thus setting the chlorine concentration of the fine powder dust to at least 5%. This is because when the cement material is dispersed in the exhaust gas so as to reduce the temperature of the extracted gas to at most 950° C., a heat loss economically disadvantageously increases. Furthermore, the dust concentration of the extracted gas increases excessively, thus increasing disadvantageously the mass of the fine powder dust finally collected and removed.

Additionally, the classification particle size in the solid-gas separation means is set to between 15 µm and 30 µm. As described above, this is because a classification particle size of less than 15 µm extremely increases the rate of chlorine particles in the fine powder dust, thus hindering the chlorine concentration of the fine powder dust from being reduced to at most 20%, while precluding the amount of the fine powder dust from being maintained between 50 g/m$^3$N and 150 g/m$^3$M. On the other hand, a classification particle size of more than 30 µm increases the amount of fine powder dust to be finally treated, above 150 g/m³N, while preventing an increase in chlorine bypass amount. This reduces economic efficiency.

Moreover, as described above, the cement material fed from the lowermost part of the preheater into the kiln inlet part via the material chute is preferably used as the cement material dispersed in the exhaust gas to increase the dust concentration of the extracted gas. This obviates the need to substantially change the existing facility. Furthermore, this cement material has a high temperature and thus preferably contains much activated CaO. Additionally, adjustment of the temperature requires dispersion of a relatively large amount of the cement material. Thus, advantageously, the chlorine concentration of the fine powder dust can be easily set to at most 20% by increasing the dust concentration of the extracted gas.

Furthermore, in parallel with the dispersion of the cement material fed into the kiln inlet part from the material chute, a cement material at 600° C. to 700° C. in the preheater, and a raw cement material exhibiting a low temperature of 50° C. to 100° C. before conveyance to the preheater may be supplied in order to adjust the temperature in the kiln inlet part. In this case, since the temperatures of these cement materials are much lower than that of the cement material fed from the material chute, dispersing a small amount of either of the cement materials in the exhaust gas enables an efficient reduction in the temperature of the extracted gas.

As a result, the present invention enables prevention of possible draft blockage in the extracted gas duct caused by an increase in dust concentration. Furthermore, a reduction in the temperature of the exhaust gas advantageously allows the above-described possible coating to be prevented.

DESCRIPTION OF SYMBOLS

1 Cement kiln
2 Kiln inlet part
3 Preheater
3a Lowermost stage cyclone
4 Material chute
4a Drop port
10 Extracted gas duct
11 Cooler
12 Cyclone classifier (Solid-gas separation means)
13 Bag filter (Dust trap means)
14 Induction fan
16 Return pipe
18 Dispersion plate (Dispersion means)
19 Drive motor (Drive means)
20 Temperature detector (Temperature detection means)
21a First control apparatus
21b Second control apparatus
22 Dust amount detection means
25 Transfer pipe for water-containing sludge (organic sludge)

DETAILED DESCRIPTION OF THE PREFERRED EMBODIMENTS

Figure 1:
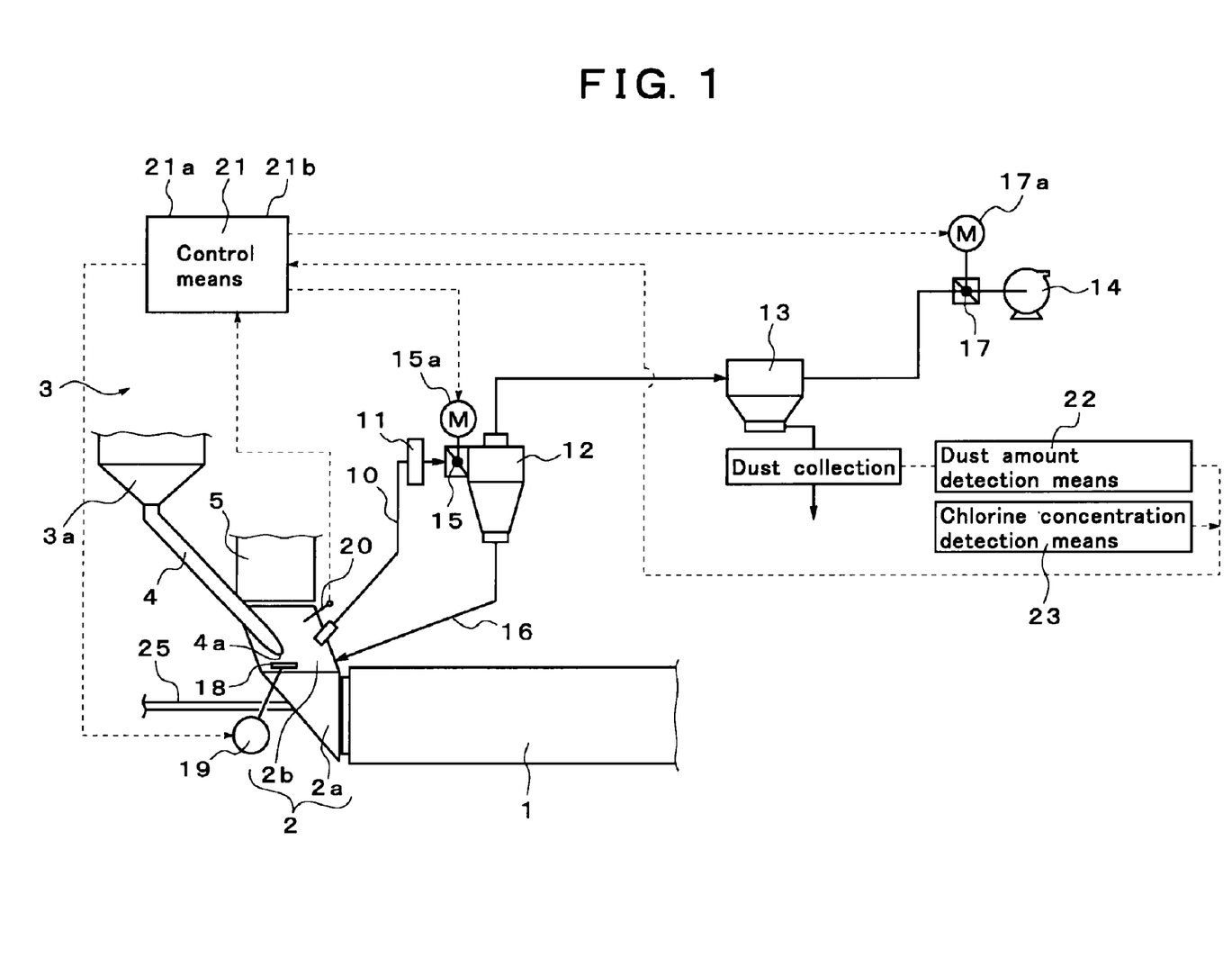
FIG. 1 is a diagram schematically showing the configuration of an embodiment of an exhaust gas treatment system for a cement burning facility according to the present invention.

FIG. 1 shows an embodiment of an exhaust gas treatment system for a cement burning facility according to the present invention.

First, a cement manufacturing facility in which the exhaust gas treatment system is installed will be described. Reference numeral 1 in FIG. 1 denotes a cement kiln configured to burn a cement material. The cement kiln 1 is a rotary kiln configured so as to be axially rotatable. In the left end part of the figure, a kiln inlet part 2 is provided which includes a kiln inlet part housing 2a supporting the rotary portion, and a rising part 2b of the kiln inlet part housing.

Furthermore, a preheater 3 configured to preheat a cement material is provided on the upper stage side of the kiln inlet part 2. A main burner configured to heat the inside of the kiln is provided in a kiln outlet part (not shown in the drawings) located in the right of the figure.

Here, the preheater 3 is composed of a plurality of stages (for example, four stages) of cyclones arranged in series in the vertical direction. A cement material is supplied to the lowermost (fourth) cyclone 3a. Furthermore, the cyclone 3a includes a material chute 4 connected to the bottom thereof and through which the cement material inside the preheater 3 is fed to the kiln inlet part 2 of the cement kiln 1.

On the other hand, an exhaust gas pipe 5 is connected to the rising part 2b of the kiln inlet part 2 so as to feed combustion exhaust gas discharged from the cement kiln 1, to the lowermost cyclone through the exhaust gas pipe 5. Thus, the exhaust gas discharged from the top of the uppermost cyclone is emitted by an exhaust fan via an exhaust line.

Moreover, in the cement manufacturing facility, a transfer pipe 25 is connected to the kiln inlet part 2 of the cement kiln 1 so as to allow sewage sludge (organic sludge) as containing water to be introduced into the cement kiln 1 for an incineration treatment.

An exhaust gas treatment system referred to as a chlorine bypass is additionally installed in the cement manufacturing facility configured as described above.

The exhaust gas treatment system is configured to extract part of exhaust gas containing dust and discharged from the cement kiln 1 and fed to the preheater 3, to obtain extracted gas, and to remove a chlorine compound contained in the extracted gas. In the figure, reference numeral 10 denotes an extracted gas duct connected to the rising part 2b of the kiln inlet part 2 of the cement kiln 1 to obtain the extracted gas.

In the exhaust gas treatment system, a cooler 11, a cyclone classifier (solid-gas separation means) 12, a bag filter (dust trap means) 13, and an induction fan 14 are provided along the extracted gas duct 10; the cooler 11 cools the extracted gas sequentially extracted from the extracted gas duct 10, the cyclone classifier (solid-gas separation means) 12 separates dust with at least a predetermined particle size from the extracted gas exhausted from the cooler 11, the bag filter (dust trap means) 13 collects and removes fine powder dust entrained in the extracted gas from which the dust with at least the predetermined particle size has been separated therefrom by the cyclone classifier 12, and the induction fan 14 is provided on the lower stage side of the bag filter 13 to suck the extracted gas.

Here, the cooler 11 reduces the temperature of the extracted gas down to at most the melting point (600° C. to 700° C.) of a chlorine compound through heat exchange between the extracted gas and a refrigerant, for example, cooling air from a cooling fan or cooling water from a cooling pump.

Furthermore, a valve 15 for flow rate adjustment which has the opening degree thereof freely adjusted by a motor 15a is interposed at an inlet for the extracted gas in the cyclone classifier 12. On the other hand, a return pipe 16 is connected to the bottom part of the cyclone classifier 12 so as to return the separated dust with at least the predetermined particle size again to the kiln inlet part 2.

Moreover, a valve 17 for flow rate adjustment which has the opening degree thereof freely adjusted by a motor 17a is interposed on the suction side of the induction fan 14.

A dispersion plate (dispersion means) 18 is provided in the kiln inlet part 2 to disperse the cement material in the exhaust gas.

The dispersion plate 18 is a plate-shaped member shaped like a square, an ellipse, a polygon, or the like, and provided below a drop port 4a of the material chute 4, so as to freely project to and retract from a position immediately below the drop port 4a with the plate surface thereof horizontally held. The dispersion plate 18 allows the cement material dropped from the drop port 4a to be dispersed in the exhaust gas in the kiln inlet part 2. A drive motor (drive means) 19 is provided at the proximal end portion of the dispersion plate 18 to project and retract the dispersion plate 18 to change the area located immediately below the drop port 4a, thus adjusting the amount of cement material to be dispersed.

Moreover, in the exhaust gas treatment system, a temperature detector (temperature detection means) 20 is provided on the rising part 2b of the kiln inlet part 2 and close to a connecting part of the extracted gas duct 10 to detect the temperature of the extracted gas. A first control apparatus 21a is provided which operates the drive motor 19 based on a detection signal from the temperature detector 20 to project and retract the dispersion plate 18 so as to maintain the temperature of the extracted gas between 950° C. and 1,150° C.

Furthermore, dust amount detection means 22 and chlorine concentration detection means 23 are provided at the bottom part of the bag filter 13; the dust amount detection means 22 detects the amount of collected fine powder dust, and the chlorine concentration detection means 23 detects the chlorine concentration of the fine powder dust.

A second control apparatus 21b is also provided which performs the following control when the detection signal from the chlorine concentration detection means 23 exhibits a value of less than of 5% or more than 20% or when the fine powder dust amount detected by the dust amount detection means 22 exhibits a value of less than 50 g/m$^3$N or more than 150 g/m$^3$N. The second control apparatus 21b actuates a motor 15a and/or a motor 17a to open and close the valve 15 and/or valve 17 for flow rate adjustment to vary the flow rate of the extracted gas so as to adjust the classification particle size of the cyclone classifier 12 to between 15 μm and 30 μm. The second control apparatus 21b thus maintains the amount of the fine powder dust collected in the bag filter 13 between 50 g/m$^3$N and 150 g/m$^3$N, while setting the chlorine concentration of the collected fine powder dust to between 5% and 20%.

Alternatively, the second control apparatus 21b may be configured to, in addition to or instead of controlling the valves 15 and 17, perform inverter control on the suction amount of the induction fan 14 to adjust the flow rate of the extracted gas in the cyclone classifier 12. The first and second control apparatuses 21a and 21b form a control apparatus 21 as a whole.

Furthermore, an introduction pipe (not shown in the drawings) is also connected to the rising part 2b so that a cement material at 600° C. to 700° C. fed from the third cyclone or a raw cement material exhibiting a low temperature of 50° C. to 100° C. before conveyance to the preheater 3 is introduced into the kiln inlet part 2 for temperature adjustment.

Now, an embodiment of an exhaust gas treatment method according to the present invention will be described which uses the exhaust gas treatment system configured as described above.

First, in the cement burning facility, a cement material is fed to the first cyclone in the preheater 3 through a supply pipe (not shown in the drawings) and then falls down sequentially through the other cyclones. During the fall, the cement material is preheated by hot exhaust gas from the cement kiln 1 rising from below. The preheated cement material is finally introduced from the lowermost cyclone 3a into the kiln inlet part 2 of the cement kiln 1 via the material chute 4.

Then, in the cement kiln 1, while being gradually fed from the kiln inlet part 2 side toward the kiln outlet part, that is, toward the right of the figure, the cement material is heated to about 1,450° C. by combustion exhaust gas from the main burner and thus burned to become clinker. Then, upon reaching the kiln outlet part, the clinker falls down into a clinker cooler. At this time, the clinker is cooled to a predetermined temperature by air fed into the clinker cooler, and finally taken out from the clinker cooler.

In parallel with the above-described operation, sewage sludge (organic sludge) is fed into the cement kiln 1 from the kiln inlet part 2 side thereof through the transfer pipe 25 and incinerated in a high-temperature atmosphere. Ash contents resulting from the incineration are utilized as part of the cement material.

In the above-described process of manufacturing cement clinker, at least one percent of the amount of the exhaust gas discharged from the cement kiln 1 is continuously or intermittently extracted by the induction fan 14 to obtain extracted gas from the kiln inlet part 2 of the cement kiln 1 through the extracted gas duct 10.

In this case, the dispersion plate 18 is located below the drop port 4a of the material chute 4 so as to disperse the cement material falling from the material chute 4, in the exhaust gas. Furthermore, to maintain the temperature of the extracted gas detected by the temperature detector 20 between 950° C. and 1,150° C., the first control apparatus 21a actuates the drive motor 19 to project and retract the dispersion plate 18 below the drop port 4a of the material chute 4 so as to adjust the amount of cement material dispersed in the exhaust gas.

In parallel with the dispersion of the cement material by the dispersion plate 18, the temperature of the kiln inlet part 2 can be adjusted by introducing, from the aforementioned introduction pipe connected to the rising part 2b, a cement material at 600° C. to 700° C. fed from the third cyclone or a raw cement material exhibiting a low temperature of 50° C. to 100° C. before conveyance to the preheater 3, into the kiln inlet part 2.

Then, the extracted gas is cooled, in the cooler 11, to at most the melting point (600° C. to 700° C.) of the chlorine compound. Thereafter, the cooled extracted gas is fed to the cyclone classifier 12, which separates coarse dust with a classification particle size of 15 μm to 30 μm from the extracted gas. The separated coarse dust is returned again to the kiln inlet part 2 through the return pipe 16.

On the other hand, the extracted gas containing fine powder dust having a particle size smaller than the above-described classification particle size and thus a high chlorine concentration is fed to the bag filter 13. In the bag filter 13, the fine powder dust entrained in the extracted gas is collected and thus removed from the extracted gas. This prevents a possible increase in the chlorine concentration in the system including the cement kiln 1 and the preheater 3. Then, the extracted gas from which the fine powder dust has been removed is fed from the exhaust side of the induction fan 14 to an exhaust gas line, where the extracted gas is exhausted.

Furthermore, the amount of the fine powder dust collected by the bag filter 13 is detected by the dust amount detection means 22. The chlorine concentration of the fine powder dust is detected by the chlorine concentration detection means 23.

When the chlorine concentration of the fine powder dust deviates from the range of 5% to 20% or the fine powder dust amount deviates from the range of 50 g/m$^3$N to 150 g/m$^3$N, the second control apparatus 21b adjusts the amount of extracted gas sucked by the induction fan 14 and/or adjusts the degrees of opening of the valves 15 and 17 by actuating the motors 15a and 17a. Thus, the flow rate of the extracted gas flowing through the extracted gas duct 10 is increased or decreased so as to adjust the classification particle size in the cyclone classifier 12. As a result, the chlorine concentration is controlled again to between 5% and 20%, with the collected fine powder dust amount maintained between 50 g/m$^3$N and 150 g/m$^3$N.

Thus, the second control apparatus 21b is not actuated if the first control apparatus 21a enables the temperature of the extracted gas to be maintained between 950° C. and 1,150° C. as described above, thus maintaining the amount of fine powder dust stably collected at a classification particle size preset for the cyclone classifier 12 between 50 g/m$^3$N and 150 g/m$^3$N, while maintaining the chlorine concentration of the fine powder dust between 5% and 20%.

As described above, according to the exhaust gas treatment method configured as described above, the fine powder dust having the high chlorine concentration and contained in the extracted gas obtained from the kiln inlet part 2 is collected and removed by the bag filter 13. This enables prevention of a possible increase in the chlorine concentration in the system including cement kiln 1 and the preheater 3.

Furthermore, the first control apparatus moves the dispersion plate 18 based on the temperature of the extracted gas to adjust the amount of the cement material dispersed in the exhaust gas in the kiln inlet part 2 from which the extracted gas is obtained, thus maintaining the temperature of the extracted gas between 950° C. and 1,150° C. Thus, the chlorine concentration of the finally collected fine powder dust can be easily set to at most 20%.

Thus, the handling property of the fine powder dust collected by the bag filter 13 is improved. Furthermore, the facility is prevented from suffering adverse effects such as blockage or clogging with the chlorine component contained in the fine powder dust during conveyance. As a result, the facility can be stably operated.

Furthermore, the amount of the fine powder dust collected by the bag filter 13 is set to between 50 g/m$^3$N and 150 g/m$^3$N. Thus, hydrogen chloride gas resulting from incineration of the organic sludge contained in the exhaust gas can be allowed to react with CaO contained in the calcined cement material and having high activity. The resulting CaCl$_2$ can be effectively collected by the dust trap means.

Moreover, the cement material containing more CaO than in the conventional art is entrained in the extracted gas. Thus, a CaO layer is formed on the surface of a filter cloth in the bag filter 13. Furthermore, SO$_2$ in the extracted gas and SO$_3$ resulting from oxidation of SO$_2$ are chemically absorbed by the CaO layer. The resulting CaSO$_3$ and CaSO$_4$ are then immobilized. This enables a reduction in sulfuric acid corrosion attributed to SO$_2$ or SO$_3$ contained in the extracted gas.

Furthermore, the classification particle size of the coarse dust returned from the extracted gas to the kiln inlet part 2 may be adjusted between 15 μm and 30 μm. This enables the use of a general-purpose cyclone classifier or the like, thus preventing an increase in facility costs.

In the above-described embodiment, only the case in which the extracted gas is obtained from the kiln inlet part 2 of the cement kiln 1 is described. However, the present invention is not limited to this aspect. The extracted gas may be obtained through the exhaust gas pipe 5 of the preheater 3.

Furthermore, the solid-gas separation means and the dust trap means may be of any types other than the above-described cyclone classifier 12 and bag filter 13.

Moreover, as drive means for the dispersion plate 18 and the valves 15 and 17, a drive source such as a hydraulic cylinder or a pneumatic cylinder may be used instead of the drive motor 19 and the motors 15a and 17a.

Furthermore, based on the detection value obtained by the chlorine concentration detection means 23, the valves 15 and 17 may be manually opened and closed, or the amount of the extracted gas sucked by induction fan 14 may be manually switched, without using the above-described second control apparatus 21b.

What is claimed is:

1. An exhaust gas treating method for a cement burning facility in a cement manufacturing facility in which a cement material is burned in a cement kiln, and in which organic sludge is introduced into a kiln inlet part or a calciner of a cement kiln for incineration, the method comprising:

burning cement material;

extracting, from a lowermost part of a preheater or the kiln inlet part of the cement kiln, exhaust gas containing dust discharged from the cement kiln and fed to the preheater that preheats the cement material, to obtain extracted gas;

cooling the extracted gas to at most a melting point of a chlorine compound;

separating, using solid-gas separation means, the dust of at least a predetermined particle size from the extracted gas;

returning the separated dust to the kiln inlet part to be burned again; and collecting and removing fine powder dust, via dust trap means, of at most the predetermined particle size from the extracted gas containing the fine powder dust, to remove the chlorine compound contained in the extracted gas, wherein the cement material is dispersed in the exhaust gas in the lowermost part of the preheater or the kiln inlet part of the cement kiln, a dispersion amount of the cement material being adjusted to maintain a temperature of the extracted gas between 950° C. and 1,150° C., and the predetermined particle size in the solid-gas separation means being adjusted to between 15 μm and 30 μm so as to maintain an amount of the fine powder dust collected by the dust trap means between 50 g/m³N and 150 g/m³N, while maintaining a concentration of chlorine in the collected fine powder dust between 5% and 20%.

2. An exhaust gas treatment system for a cement burning facility provided in a cement manufacturing facility including a transfer pipe connected to a kiln inlet part or a calciner of a cement kiln burning a cement material, to introduce organic sludge into the cement kiln for incineration, the exhaust gas treatment system extracting exhaust gas containing dust discharged from the cement kiln and fed to a preheater that preheats the cement material, to obtain extracted gas, and removing a chlorine compound contained in the extracted gas, the system comprising:

an extraction duct connected to a lowermost part of the preheater or the kiln inlet part of the cement kiln via which the extracted gas is obtained:

a cooler that cools the extracted gas obtained from the extraction duct to at most a melting point of the chlorine compound;

solid-gas separation means for separating the dust of at least a predetermined particle size from the extracted gas exhausted from the cooler;

dust trap means for collecting and removing fine powder dust of at most the predetermined particle size entrained in the extracted gas with the dust of at least the predetermined particle size removed therefrom in the solid-gas separation means;

dust amount detection means for measuring an amount of the fine powder dust collected by the dust trap means;

an induction fan provided on a lower stage side of the dust trap means to suck the extracted gas;

dispersion means for dispersing the cement material in the exhaust gas, the dispersion means being provided inside the lowermost part of the preheater or the kiln inlet part of the cement kiln and near a connection part of the extraction duct;

drive means for adjusting an amount of the cement material dispersed by the dispersion means;

temperature detection means for detecting a temperature of the extracted gas;

a first control apparatus that controls the drive means based on the temperature detected by the temperature detection means, to maintain the temperature of the extracted gas between 950° C. and 1,150° C.; and a second control apparatus that adjusts the predetermined particle size in the solid-gas separation means to between 15 μm and 30 μm so as to maintain the amount of the fine powder dust detected by the dust amount detection means between 50 g/m³N and 150 g/m³N, while maintaining a concentration of chlorine in the collected fine powder dust between 5% and 20%.

3. The exhaust gas treatment system for the cement burning facility according to claim 2, wherein the solid-gas separation means is a cyclone classifier, wherein a flow rate adjustment apparatus for the extracted gas is provided at an inlet side of the cyclone classifier, wherein the dust trap means is a bag filter including a chlorine concentration detection apparatus for the fine powder dust collected from the bag filter, and wherein the second control apparatus adjusts the predetermined particle size to between 15 μm and 30 μm by controlling a suction amount of the extracted gas sucked by the induction fan and/or the flow rate adjustment apparatus for the extracted gas based on a detection signal from the chlorine concentration detection apparatus and the amount of the fine powder dust detected by the dust amount detection means so as to set the amount of the fine powder dust collected by the dust trap means to between 50 g/m³N and 150 g/m³N and the concentration of chlorine in the collected fine powder dust to between 5% and 20%.

* * * * *